United States Patent
Beckmann (10) Patent No.: US 11,060,498 B2
(45) Date of Patent: Jul. 13, 2021

(54) METHOD AND DEVICE FOR STARTING AN INTERNAL COMBUSTION ENGINE HAVING HIGH ALCOHOL CONTENT IN THE FUEL

(71) Applicant: Vitesco Technologies GmbH, Hannover (DE)

(72) Inventor: Reiner Otto Beckmann, Valinhos (BR)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/600,005

(22) Filed: Oct. 11, 2019

(65) Prior Publication Data

US 2020/0040862 A1    Feb. 6, 2020

Related U.S. Application Data (63) Continuation of application No. PCT/EP2018/059199, filed on Apr. 10, 2018.

(30) Foreign Application Priority Data

Apr. 12, 2017    (DE) ...................... 10 2017 206 301.7

(51) Int. Cl.
| | | |
|---|---|---|
| *F02D 41/30* | (2006.01) | |
| *F02P 5/15* | (2006.01) | |
| *F02D 19/08* | (2006.01) | |
| *F02D 37/02* | (2006.01) | |

(52) U.S. Cl.
CPC .............. *F02P 5/15* (2013.01); *F02D 19/084* (2013.01); *F02D 37/02* (2013.01)

(58) Field of Classification Search
CPC .. F02D 19/061; F02D 19/084; F02D 41/0025; F02D 37/02; F02P 5/15
See application file for complete search history.

(56) References Cited

U.S. PATENT DOCUMENTS

| 4,646,691 A | 3/1987 | Kiyota et al. |
| 4,911,116 A | 3/1990 | Prohaska et al. |

(Continued)

FOREIGN PATENT DOCUMENTS

| BR | 102014011512 | 10/2015 |
| DE | 2536432 A1 | 2/1977 |

(Continued)

OTHER PUBLICATIONS

International Search Report and Written Opinion, dated Jul. 4, 2018, for counterpart PCT application PCT/EP2018/059199.

(Continued)

*Primary Examiner* — Hai H Huynh
*Assistant Examiner* — Gonzalo Laguarda (57) ABSTRACT

A method and a corresponding device are disclosed for starting an internal combustion engine designed for alcohol or a high content of alcohol in a mixed alcohol-gasoline fuel, including setting an early starting ignition time point in a first time period beginning immediately after the activation of the starting process of the engine. The rotational speed of the internal combustion engine is monitored and the number of the cylinder working cycles is summed during the starting process and, upon exceeding a predetermined rotational speed threshold value, the number of those cylinder working cycles is summed in which there occurs a rotational speed increase greater than a predetermined threshold value. The number of the cylinder working cycles is compared with predetermined threshold values and, upon reaching or exceeding the threshold values, the ignition time point is shifted starting from the early ignition time point toward a late ignition time point.

18 Claims, 2 Drawing Sheets

(56) References Cited

U.S. PATENT DOCUMENTS

| | | | |
|---|---|---|---|
| 4,995,367 A | | 2/1991 | Yamauchi et al. |
| 5,146,882 A | | 9/1992 | Brinkman et al. |
| 5,327,866 A | | 7/1994 | Kitajima |
| 6,334,431 B1 | | 1/2002 | Kanehiro et al. |
| 9,932,916 B2 | * | 4/2018 | Kondo ............... F01N 3/101 |
| 2007/0266981 A1 | | 6/2007 | Murase |
| 2007/0215069 A1 | | 9/2007 | Leone |
| 2009/0159042 A1 | | 6/2009 | Nakagawa |
| 2009/0282903 A1 | | 11/2009 | Nagano et al. |
| 2011/0301828 A1 | * | 12/2011 | Moriya ............ F02D 19/061 701/105 |
| 2014/0331968 A1 | * | 11/2014 | Courtiel ........... F02D 19/084 123/406.47 |
| 2019/0293046 A1 | * | 9/2019 | Andersson ............. F02D 9/02 |

FOREIGN PATENT DOCUMENTS

| | | |
|---|---|---|
| DE | 10351206 A1 | 6/2005 |
| DE | 102013222498 A1 | 5/2015 |
| EP | 1013923 A2 | 6/2000 |
| JP | S5752665 A | 3/1982 |
| JP | 2011064103 A | 3/2011 |

OTHER PUBLICATIONS

German Office Action dated Sep. 26, 2017, for counterpart DE patent application 10 2017 206 301.7.

Swedish Office Action dated May 26, 2020 or the counterpart Swedish Patent Application No. 1951281-3.

\* cited by examiner

METHOD AND DEVICE FOR STARTING AN INTERNAL COMBUSTION ENGINE HAVING HIGH ALCOHOL CONTENT IN THE FUEL

CROSS REFERENCE TO RELATED APPLICATIONS

This application claims the benefit of PCT Application PCT/EP2018/059199, filed Apr. 10, 2018, which claims priority to German Application DE 10 2017 206 301.7, filed Apr. 12, 2017. The disclosures of the above applications are incorporated herein by reference.

FIELD OF INVENTION

The invention relates to a method and to a device for starting an internal combustion engine, wherein the internal combustion engine is supplied with fuel which has a high alcohol content.

BACKGROUND

Vehicles are known which can be operated both with alcohol fuels or mixed alcohol fuels, that is to say with fuels having variable alcohol contents, and with gasoline as the only fuel component. Here, the alcohol, for example methanol or ethanol, in the fuel can be present in different contents in the range from 0 to 100%. Such fuels are also referred to as "flex fuels" or "flexible fuels" (FF), and the motor vehicles which can be operated therewith are referred to as flexible fuel vehicles (FFV). A conventional alcohol-gasoline mixture in Europe and the USA is for example E85, that is to say 85% of ethanol in the fuel, in which the gasoline content is therefore 15%. In some countries, the ethanol content in the fuel is lowered in the winter months, for example to 75%. In Brazil, E100, that is to say pure ethanol, is also provided as fuel for operating internal combustion engines in vehicles. Wherever reference is made below to E100 as fuel, it should be borne in mind that generally such a fuel can contain 5-7% of water.

Flex-fuel vehicles thus offer the possibility of refueling both with conventional gasoline and with these mixed ethanol fuels, since the current gasoline-ethanol concentration in the fuel is detected by means of an alcohol sensor or by means of a model calculation in the electronic engine controller and corresponding parameters for controlling the internal combustion engine are adapted.

The use of such mixed fuels having a high ethanol content or the operation exclusively with ethanol has the disadvantage that, in the case of low temperatures, the vehicle can be started only with difficulty, since ethanol has a relatively high boiling point (78° C. at 1013 hPa) and low vapor pressure, that is to say vaporizes very poorly at low temperatures. As a result of the addition of ethanol, the overall content of readily volatile fuel contents is reduced and the cold starting capability is adversely affected. The minimum starting temperature without additional cold starting systems is approximately −20° C. when E85 fuel is used and approximately +15° C. when E100 fuel is used.

Since cold starting problems therefore occur unless special provisions are made, in vehicles which permit operation with up to 100% of ethanol as fuel (E100), small, permanently installed additional fuel containers which contain a small quantity of starting fuel, for example gasoline, are carried along in the engine compartment. This starting fuel is then used to start the vehicle below certain external temperatures or, in addition to the ethanol, is injected at a central point in the intake manifold so that a combustible fuel-air mixture is produced.

However, the problem here is that the cold starting system is relatively rarely required, only small quantities of starting fuel are taken from the additional container and in the course of time said starting fuel becomes increasingly degraded. The property "degraded" is to be understood in this context as meaning that the readily volatile hydrocarbon contents such as propane and butane readily vaporize and escape from the additional container as a result of the high temperatures in the engine compartment during the operation of the internal combustion engine and hence of the vehicle, and as a result of the strong shaking of the vehicle during operation. The components which are required for a cold start are then lost or at least considerably reduced. In certain circumstances, it is then no longer possible to carry out a cold start. Furthermore, such a system with a separate tank is costly in terms of maintenance and constitutes a potential hazard owing to its accommodation in the engine compartment (crash zone).

Documents U.S. Pat. Nos. 4,911,116 A and 4,646,691 A describe fuel supply systems for internal combustion engines of a motor vehicle which are operated with alcohol and have separate cold starting tanks which contain gasoline which is used to start the engine. Subsequently, when the engine has been started and begins to become warm, instead of the cold starting fuel, the main tank having the alcohol-containing fuel is connected. It is disadvantageous here that both tanks require separate filling, that is to say feed lines to the outside of the vehicle body and separate fuel tank flaps. The driver also has to keep an eye on the fuel level in both tanks so as to be able to refill them in good time. Furthermore, the driver must differentiate between two separate fuel tank connectors, which, if not done properly, can lead to incorrect filling of at least one of the two tanks.

DE 25 36 432 A1 discloses an internal combustion engine which can be operated with alcohol fuels and mixed alcohol fuels and in which a cold starting device with an electrically operated heating device is provided in a secondary intake duct bypassing a main mixture-forming device. The necessary air for the cold starting mixture is branched off from the main air intake duct, wherein the flow connection can be interrupted by a shut-off device. The starting ability of the internal combustion engine at low ambient temperatures is improved by heating the fuel-air mixture.

JP-A-52 665/1982 discloses a heating device for heating an inlet line, wherein the heating device is controlled in accordance with the output of an alcohol concentration sensor, and in which the heat generation quantity of the heating device becomes larger if the alcohol concentration assumes a reference value or is higher than said value.

DE 103 51 206 A1 describes an injection valve, in particular for injecting fuel into the intake duct of internal combustion engines in vehicles. Said valve has a valve housing with an injection opening, a fuel inflow duct and a heating module, which is fitted onto the valve housing on its end facing away from the injection opening, with a module housing fastened to the valve housing, and a heating element which heats the fuel flowing through the module housing. As a result, even when there is a cold start of the internal combustion engine, the fuel is brought quickly to the set-point temperature of, for example, 80° C. required for a very good atomization. The so-called flash boiling effect, in which the fuel vaporizes spontaneously and is optimally atomized, can occur during the injection under these conditions.

Instead of heating each individual injection valve electrically, it is also known to heat the fuel distributor rail to which the injection valves are connected.

Furthermore, it is known to equip such flex-fuel vehicles with a cold starting system in the form of an electrical engine block heater which is connected via cables and conventional sockets to the 230V power supply. Such external heating devices, generally referred to as block heaters, serve for heating the coolant of the internal combustion engine at very low ambient temperatures and are thus intended to facilitate the starting of the internal combustion engine.

Cold starting devices using such fuel preheating systems are comparatively expensive to manufacture, and the engine starting process can occur only after a certain time which is required for preheating the fuel.

In addition, a very high amount of unburnt fuel enters the engine oil at the cold start and subsequent warming up, with the result that the viscosity of the engine oil and thus the mechanical durability of certain engine components is negatively influenced. At relatively high engine oil temperatures, a large amount of fuel is suddenly vaporized out of the engine oil owing to the boiling point of ethanol, which fuel is fed to the combustion and greatly enriches or over-enriches the combustion mixture.

US 2014/0331968 A1 describes a method for the cold starting of an internal combustion engine which is operated with ethanol. To control the ignition time point, a basic ignition characteristic map is stored in a control device. The temperature of the internal combustion engine is determined and after synchronization, upon reaching a threshold value for the fuel pressure, fuel is injected directly into the cylinder at high pressure by means of a high-pressure injection valve for a first cycle. Below a determined threshold value for the internal combustion engine temperature, the first ignition time point is adjusted toward early with respect to the compression top dead center of the piston, specifically in a range between 21° and 50° crank angle before the compression top dead center (TDC) of the piston.

SUMMARY

An object of example embodiments of the invention includes specifying a method and a corresponding device for starting an internal combustion engine which can be reliably started even with very high alcohol contents in the fuel and at low temperatures.

The example embodiments are distinguished by a method and a corresponding device for starting an internal combustion engine designed for alcohol or a high content of alcohol in a mixed alcohol-gasoline fuel, wherein an early starting ignition time point is set in a first time period beginning immediately after the activation of the starting process of the internal combustion engine, which starting ignition time point lies in a range from 60° crank angle to 100° crank angle before the top dead center of a piston of the internal combustion engine. The rotational speed of the internal combustion engine is monitored during the starting process. Upon reaching or exceeding a predetermined rotational speed threshold value or when there is a significant rotational speed increase, in addition to the cylinder working cycles already summed during the starting process, the number of those cylinder working cycles is summed in which there occurs a rotational speed increase greater than a predetermined threshold value or a predetermined differential rotational speed to the starter rotational speed. The number of the cylinder working cycles is compared with predetermined threshold values and, upon reaching or exceeding the threshold values, the ignition time point is shifted starting from the early ignition time point toward a late ignition time point.

The method makes it possible to carry out a combustion process and thus an internal combustion engine start even at low temperatures, even if the fuel used is a fuel having a very high ethanol content, up to E100.

The use of a very early ignition time point up to 100° crank angle before TDC during the cold starting of the internal combustion engine achieves not only a considerable reduction in the starting time but also an improvement in the combustion behavior, in particular a reduction in the amount of fuel entering the lubricating oil of the internal combustion engine.

The components necessary in conventional cold starting systems for such internal combustion engines operated with mixed fuels or pure alcohol, such as additional tanks for a starting fuel or fuel preheaters of any kind, may be dispensed with. Since no time span has to be waited out until such heating devices bring the fuel to a temperature at which the fuel reliably combusts, the starting process may begin without a waiting time.

BRIEF DESCRIPTION OF THE DRAWINGS

Further embodiments and advantages of the invention will emerge on the basis of the description of an exemplary embodiment which is explained in more detail below with reference to the schematic drawing, in which.

DETAILED DESCRIPTION

Figure 1:
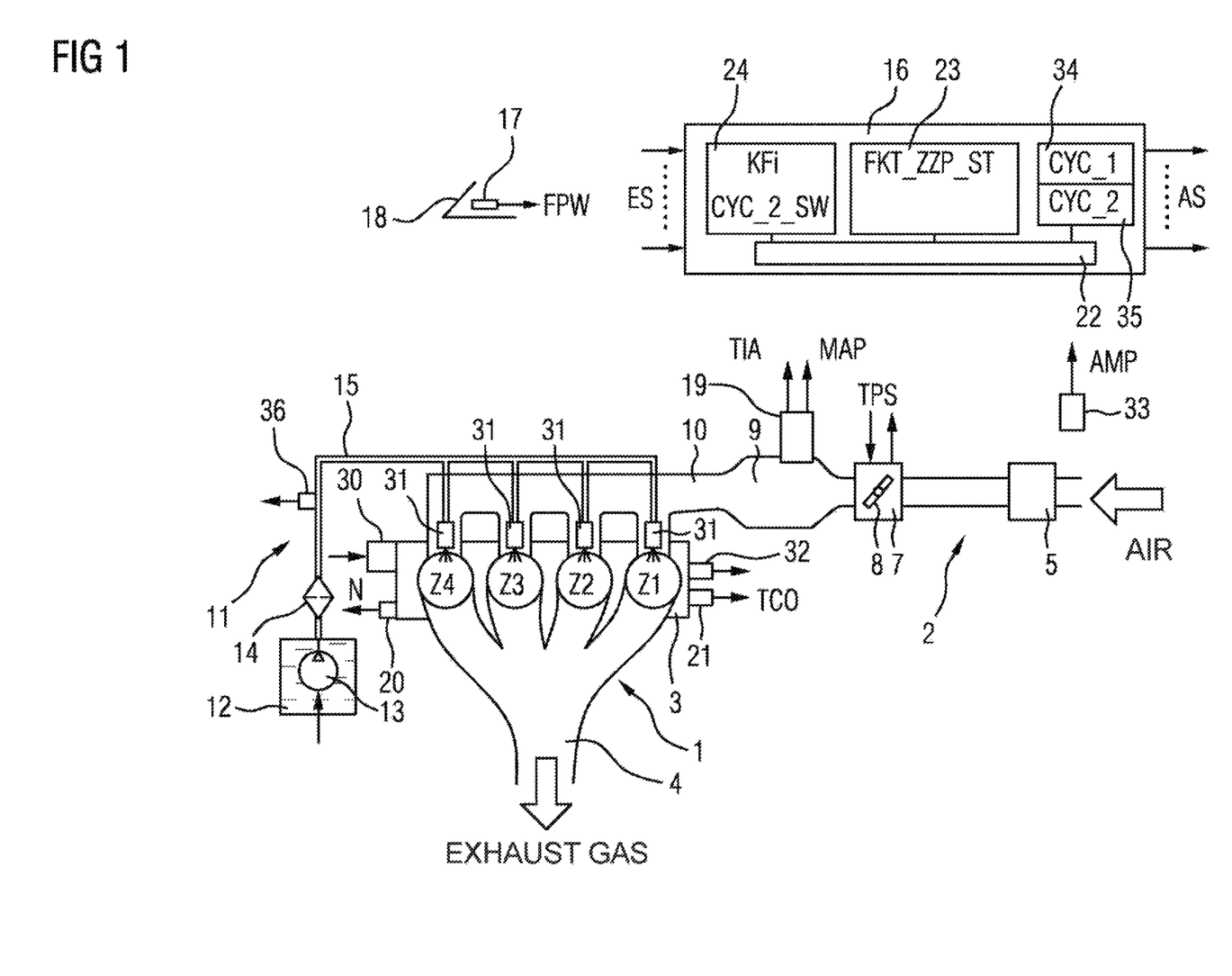
FIG. 1 shows in a schematic illustration an internal combustion engine, which may be operated with a high ethanol content in the fuel, with associated control device.

FIG. 1 is a schematic illustration showing a multi-cylinder internal combustion engine 1 with external mixture formation, which engine may be operated with a high ethanol content in the fuel, in particular with pure ethanol as fuel (E100). Here, only the components necessary to understand the invention are illustrated.

The term "external mixture formation" is used in the context of a spark ignition engine if the fuel is introduced (fed in advance) into the intake manifold, for example in the direction of the gas inlet valve, and the fuel-air mixture is thus formed outside the combustion chamber. This is also referred to as duct injection.

The internal combustion engine 1 has an intake tract 2, an engine block with four cylinders Z1 to Z4 and a cylinder head 3, and also an exhaust tract 4.

The fresh air required to burn the fuel is fed to the internal combustion engine 1 via the intake tract 2. In the intake tract 2 there are provided, as viewed in the flow direction of the sucked-in air (indicated arrow symbol), an air filter 5 and a throttle valve block 7 with a throttle valve 8 and a throttle valve sensor (not denoted in more detail) for detecting the degree of opening TPS of the throttle valve 8. The throttle valve 8 is designed as an electromotively activatable throttle valve (E-GAS) whose degree of opening TPS may be set both by actuation by the driver (driver's request) and via signals of an electronic control device 16 which performs open-loop and closed-loop control on the internal combustion engine 1.

The intake tract 2 further includes a collector 9 which opens into an intake manifold 10 common to all cylinders Z1 to Z4. This intake manifold 10 branches in the vicinity of the cylinders Z1 to Z4 in such a way that an inlet duct (not denoted in more detail) leads to each cylinder Z1 to Z4. A fuel injector 31 is arranged in each of the inlet ducts. As a result, when necessary, fuel from the fuel injectors 31 may be fed in advance to the corresponding cylinders Z1 to Z4, and, after the opening of gas inlet valves (not shown) which are assigned to the cylinders Z1 to Z4, the fuel-air mixture may flow into the cylinders Z1 to Z4.

Instead of only one inlet duct per cylinder, it is also possible to provide two inlet ducts per cylinder, in each of which a fuel injector is arranged, as is described for example in DE 10 2013 222 498 A1. As a result, each cylinder is supplied with a fuel-air mixture by means of two fuel injectors.

Provided in the collector 9 is a sensor module 19 which includes both an intake manifold pressure sensor and a temperature sensor. The intake manifold pressure sensor serves as a load sensor and outputs a signal MAP (manifold air pressure) which represents the intake manifold pressure. The temperature sensor outputs a signal TIA (temperature intake air) which represents the temperature in the collector 9.

Instead of a sensor module 19 which contains both sensors, separate sensors for the intake manifold pressure MAP and the temperature TIA may also be present in the collector 9 and/or in the intake manifold 10. Furthermore, an air mass meter (not shown) installed in the intake tract 2 may be used as load sensor instead of the intake manifold pressure sensor.

A fuel supply device 11 is also assigned to the internal combustion engine 1. Here, the fuel is fed from a fuel tank 12 by an electric fuel pump 13 (in-tank pump) which is generally arranged inside the fuel tank 12 into a fuel line 15 which contains a fuel filter 14 and is common to all the fuel injectors 31. The fuel line 15 branches in the vicinity of the cylinder head 3 to form individual feed lines (not denoted in more detail in FIG. 1) so that each fuel injector 31 of each cylinder Z1 to Z4 may be supplied with fuel.

The exhaust gases which are produced during the combustion are expelled into the exhaust tract 4 by opening gas outlet valves and pass into the surroundings after purification by means of one or more exhaust gas catalytic converters of a known design and a silencer.

In order to start the internal combustion engine 1, an electric starting device 30 is provided which may include a conventional starter or a starter generator (belt-type starter generator or crankshaft-type starter generator).

The electronic control device 16 is assigned sensors which detect various measurement variables and in each case determine the measured value of the measurement variable. The control device 16 determines, as a function of at least one of the measurement variables, manipulated variables which are then converted into one or more actuating signals for controlling the actuators by means of corresponding actuator drives.

The sensors are, inter alia, an accelerator pedal position encoder 17 which detects the position of an accelerator pedal 18 and outputs a corresponding signal FPW (accelerator pedal value), the sensor module 19, a crankshaft angle sensor 20 which detects a crankshaft angle to which a rotational speed N is then assigned, a camshaft sensor 32 which outputs a signal corresponding to the position of a camshaft of the internal combustion engine 1, a temperature sensor 21 which detects a coolant temperature TCO of the internal combustion engine 1, an alcohol sensor 36 which detects the alcohol content in the fuel, and a pressure sensor 33 which detects the ambient pressure AMP. Depending on the embodiment of the invention, an arbitrary subset of said sensors or else additional sensors may be present, the signals of which are generally indicated by the reference sign ES in FIG. 1.

The actuators are, for example, the throttle valve 8, the fuel injectors 31, the electric fuel pump 13, the starting device 30 and spark plugs (not shown). Further signals for further actuators which are necessary to operate the internal combustion engine 1, but are not explicitly illustrated, are designated generally by the reference sign AS in FIG. 1.

The electronic control device 16 corresponds to a device for controlling the internal combustion engine 1 and may also be referred to as an engine control unit. Such control devices 16, which generally contain one or more microprocessors, are known per se, and therefore the discussion below will focus only on the design that is relevant in connection with the invention and the functioning of said design.

The control device 16 may include a computational unit (processor) 22 which is coupled to a program memory 23 and a value memory (data memory) 24. The program memory 23 and the value memory 24 store programs or values which are required for the operation of the internal combustion engine 1. In particular, a control method FKT_ZZP_ST with which the internal combustion engine 1 may be reliably started even in the case of very high ethanol contents in the fuel (up to E100) and at low temperatures is implemented in the program memory 23. A plurality of characteristic maps KFi, whose meanings are explained in more detail with reference to the description of FIGS. 2A-2C, are stored in the data memory 24.

Furthermore, two segment counters 34, 35, also referred to as cycle counters, are provided in the control device 16, the function of which counters is likewise explained in more detail with reference to the description of FIGS. 2A-2C.

Figure 2A:
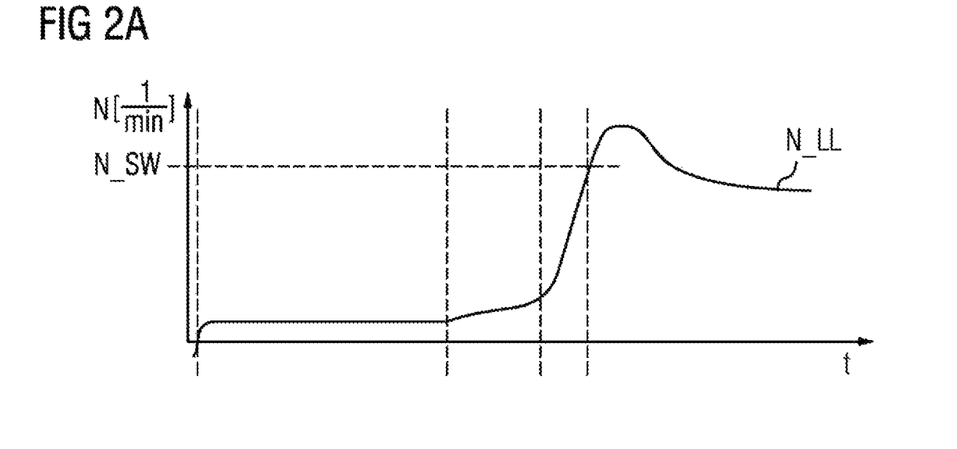
FIGS. 2A-2C show time profiles of parameters during the cold start of the internal combustion engine.
Figure 2B:
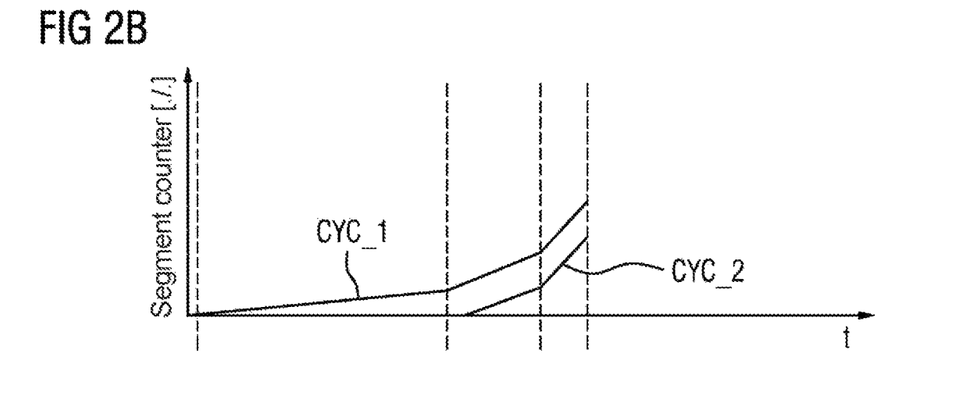
Figure 2C:
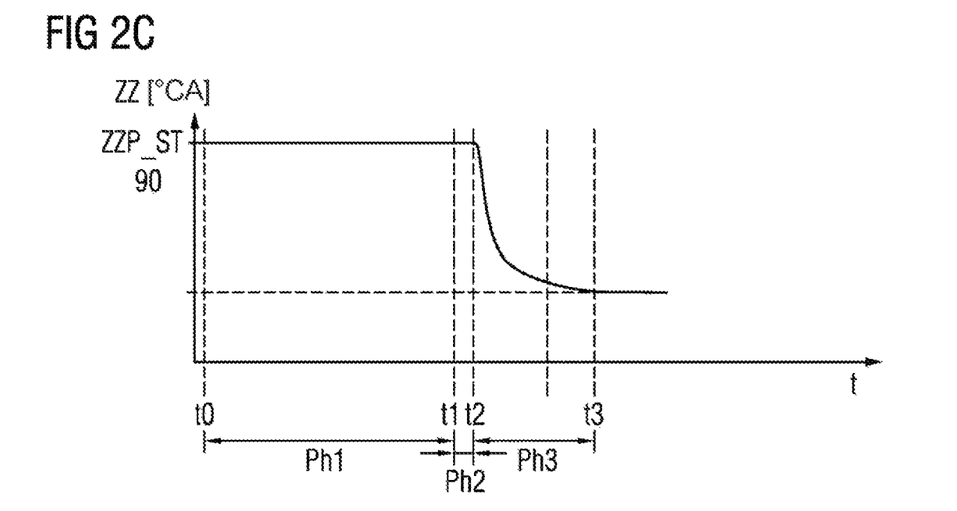

FIGS. 2A to 2C illustrate in a purely qualitative fashion the time profiles of system variables during a cold start of the internal combustion engine 1. FIG. 2A shows the profile of the rotational speed N during the starting process of the internal combustion engine 1, FIG. 2B shows the counts CYC_1 and CYC_2 of the two segment counters 34, 35, and FIG. 2C shows the ignition time point ZZP.

The ignition time point ZZP denotes the crankshaft position of the internal combustion engine with external ignition (spark ignition engine) at which the ignition spark is triggered at the spark plug. It is generally indicated in degrees crank angle (° C.A) before the top dead center TDC (=highest position of the piston in the cylinder).

An "early ignition time point" is characterized by the triggering of the ignition spark at the spark plug at a time point in degrees crank angle which lies far before the top dead center TDC. A late ignition time point is characterized by the triggering of the ignition spark at the spark plug at a time point in degrees crank angle which lies shortly before the top dead center TDC or else after the top dead center TDC. This means the ignition time point is adjusted toward late if the triggering of the ignition spark is adjusted in degrees crank angle from far before the TDC to shortly before TDC or even after TDC.

If non-preheated fuel having a high ethanol content up to E100 is injected into the intake duct at low coolant temperatures of the internal combustion engine, condensation of the injected fuel or formation of liquid fuel contents occurs on the cold components of the internal combustion engine.

The flame propagation speed, that is to say the speed at which the flame front propagates within the combustion chamber after the triggering of the ignition, has different values depending on the droplet size (droplet diameter) of the injected fuel, which is generally expressed by the Sauter mean diameter (SMD), and on the ethanol content. After the triggering of the ignition with the ignition time point ZZP before the top dead center, a very long time passes until there occurs an increase in the pressure in the cylinder as a result of the incipient combustion. The flame propagation speed is very low during the starting process with fuels with a high ethanol content at low coolant temperatures and with a large droplet diameter. The maximum cylinder pressure must lie after the top dead center in order to accelerate the piston and in order to avoid serious engine damage.

The ignition time point ZZP of the internal combustion engine 1 is customarily controlled by the control device 16 of the internal combustion engine 1. The control device 16 stores the data for the ignition time point ZZP in a corresponding characteristic map KF1 as a function of operating states of the internal combustion engine 1 and the environmental influences.

In order, in the case of an internal combustion engine 1 with external mixture formation (intake manifold injection, duct injection), to improve the starting process with fuels having a high ethanol content of up to E100 at low coolant temperatures, the ignition time point ZZP is selected to be very early. Ignition time points ZZP up to 50° before the top dead center TDC are customarily known for starting an internal combustion engine having external ignition (spark ignition engine).

Before a time point t0 (FIG. 2C) of a starting process of the internal combustion engine 1, the starting device 30, that is to say a starter or starter generator, is not yet actuated, and the rotational speed N of the internal combustion engine 1 is zero and the counts CYC_1 and CYC_2 of the two segment counters 34, 35 are likewise zero.

A cold start of the internal combustion engine 1 occurs at the time point t0, and the ignition time point ZZP is here set to a very early starting ignition time point ZZP_ST which lies in the range between 90° C.A and 100° C.A. A value of 90° C.A is chosen for example in FIG. 2C.

As illustrated in FIG. 2, the starting process of the internal combustion engine 1 is divided, as considered temporally, into three successive phases which are designated as time periods Ph1 to Ph3.

As already mentioned above, the flame propagation speed is dependent on the minimum droplet size which may be achieved by the injection of the fuel. If no combustion has yet taken place in the cylinder, the components in the combustion chamber are still comparatively cold and the injected fuel condenses partially or cannot vaporize on the combustion chamber walls. A starting ignition time point ZZP_ST of 90° C.A up to 100° C.A before TDC may be used in the first combustion cycles for each cylinder, because the propagation of the flame front proceeds very slowly and the maximum combustion pressure in the cylinder, even in the case of a starting ignition time point ZZP_ST of 90° C.A to 100° C.A before TDC, lies only after the top dead center TDC. The very early starting ignition time point ZZP_ST allows the torque to be generated earlier in time on the crankshaft. The rotational speed increase in the cold start may occur earlier in time because the cylinder temperature increases earlier as a result of the combustion process, with the result that the starting time is shortened.

The actuation of the starting device 30 at the time point t0 sets the crankshaft of the internal combustion engine 1 in rotation, and the rotational speed N increases slightly (FIG. 2A).

At the same time as the starting device 30 is activated, the segment counter 34 in the control device 16 is also started. The number of the cylinder working cycles (segments or cycles) CYC_1 is determined on the basis of the signals of the crankshaft angle sensor 20 and of the camshaft sensor 32. If the crankshaft of the internal combustion engine 1 rotates and the synchronization between the two sensors 20, 32 is concluded, this information is obtained with the aid of a crankshaft transducer wheel (generally a 60-2 toothed wheel) and of a sensor (generally a Hall sensor) which senses the crankshaft transducer wheel. In the case of a 4-stroke internal combustion engine 1, a working cycle includes two rotations of the crankshaft, that is to say 720° C.A. If, as in the example shown in FIG. 1, the internal combustion engine 1 has 4 cylinders Z1-Z4, these 720° C.A are divided into four segments of 180° C.A each, with each segment being assigned to a cylinder. This is referred to here as cylinder working cycle CYC_1. The count CYC_1 of the segment counter 34 is thus increased by the value 1 every 180° C.A. The segment counter 34 is in any case present in the system and its count CYC_1 is used, for example, to control the throttle valve in order to set its degree of opening so that a combustible mixture is produced in the combustion chamber. In addition, the count CYC_1 of the segment counter 34 serves to reduce the fuel mass during the starting operation with advancing time starting from a starting value.

In the first time period Ph1 of the starting process, which covers the time interval t0 to t1, ignitions are triggered by the spark plugs but no combustions yet take place because no ignitable fuel-air mixture is yet present. The rotational speed N remains constant, the crankshaft of the internal combustion engine being entrained by the starting device 30.

If the rotational speed N exceeds a certain threshold value or increases with respect to the rotational speed entrained by the starting device 30 because first combustions have taken place in the combustion chambers, (time point t1), the segment counter is started, i.e. when the internal combustion engine 1 generates a torque on its own, that is to say is released from the support of the starting device 30. The segment counter 35 counts those segments CYC_2 with a rotational speed increase per time (rotational speed gradient) greater than a threshold value or a difference to the rotational speed entrained by the starting device greater than a threshold value. The count CYC_1 of the segment counter 34 is increased in parallel further per segment (180° C.A) by the value 1. The threshold value of the rotational speed and the threshold value of the rotational speed difference as a function of the counts CYC_1, CYC_2 is determined experimentally on the test bench or in the vehicle and is stored as a function of the coolant temperature TCO of the internal combustion engine 1 in a characteristic map KF2 in the value memory 24 of the control device 16, since the coolant temperature TCO decisively influences the rotational speed of the starting device and the rotational speed gradient. If the internal combustion engine 1 is started at a temperature of, for example, 0° C. with ethanol E100, it builds up a larger torque for each combustion than if it is started at a temperature of −5° C.

The rotational speed N increases slightly from the time point t1 on account of the combustions which are now occurring, and the higher the rotational speed N becomes, the quicker the counts CYC_1 of the segment counter 34 and CYC_2 of the segment counter 35 increase. The ignition time point ZZP is also still held after the time point t1 at the very early starting ignition time point ZZP_ST at the beginning of the starting (from 90° C.A-100° C.A) of the internal combustion engine 1 for a certain segment number or time span, namely during the time period Ph2.

The time point t2 from which the ignition time point ZZP is pushed back from the starting ignition time point ZZP_ST, that is to say is adjusted toward late, is dependent on the counter content CYC_1 of the segment counter 34 and/or on the counter content CYC_2 of the segment counter 35. If the counter content CYC_1 or CYC_2 reaches a predetermined threshold value CYC_1_SW or CYC_2_SW which is determined experimentally on the test bench or in the vehicle as a function of the ethanol content in the fuel and is stored for example in KF2, KF3, it is assumed that the temperature in the cylinder has increased to such an extent that, in the subsequent combustion with the starting value ZZP_ST, a pressure increase already occurs before the top dead center TDC and the starting ignition time point ZZP, as illustrated in FIG. 2C, is taken back during the time period Ph3, initially with a relatively steep gradient and then with a smaller gradient, to a conventional value of the ignition time point ZZP during the starting process up to the time point t3 in the range from 50° C.A to 40° C.A. The threshold values CYC_1_SW and CYC_2_SW are stored in the characteristic maps KF2, KF3 in the value memory 24 of the control device 16.

The content CYC_1 of the segment counter 34 or CYC_2 of the segment counter 35 is, as mentioned above, decisive for pushing back the starting ignition time point ZZP, but not decisive for the criterion of when the starting process is ended. The starting process of the internal combustion engine 1 is ended when the rotational speed N has reached a minimum rotational speed N_SW. This rotational speed value is likewise determined experimentally on the test bench or in the vehicle as a function of the ethanol content in the fuel and is stored in a characteristic map KF4 in the value memory 24 of the control device 16. It is generally in a range from 600 l/min to 1000 l/min.

In FIG. 2C, this time point is designated by t3. After this time point t3, there occurs a conventional overshoot of the rotational speed N and the latter then stabilizes to a value which is designated as idle rotational speed N_LL. The ignition time point ZZP in the time period after the time point t3 is then controlled in a conventional manner.

The invention has been explained on the basis of an internal combustion engine with four cylinders which is operated with pure ethanol (E100) or a mixed fuel which contains a relatively high ethanol content (for example E85). However, it may be applied both to internal combustion engines with different numbers of cylinders and to internal combustion engines which, instead of ethanol, are operated with other fuels which have a high boiling point and low vapor pressure, such as methanol, for example.

LIST OF TERMS/REFERENCE SIGNS 1 internal combustion engine
2 intake tract
3 cylinder head
4 exhaust tract
5 air filter
6 throttle valve block
7 throttle valve
8 collector
9 common intake manifold
10 fuel supply device
11 fuel tank
12 electric fuel pump
13 fuel filter
14 fuel line
15 electronic control device
16 accelerator pedal position encoder
17 accelerator pedal
18 sensor module for temperature and pressure in the intake tract
19 crankshaft angle sensor
20 coolant temperature sensor
21 computational unit, processor
22 program memory
23 value memory, data memory
30 starting device
31 fuel injector
32 camshaft sensor
33 ambient pressure sensor
34 segment counter, cycle counter
35 segment counter, cycle counter
36 alcohol sensor
AMP ambient pressure
AS output signals, actuating signals
CYC_1 count of the segment counter 34
CYC_2 count of the segment counter 35
CYC_1_SW count threshold value
CYC_2_SW count threshold value
ES input signals
FKT_ZZP_ST function for setting the ignition angle during the cold start
FPW accelerator pedal value
KF1-KF4 characteristic map
MAP pressure in the intake tract, intake manifold pressure
N rotational speed of the internal combustion engine
N_LL idle rotational speed
N_SW minimum rotational speed
Ph1-Ph3 time periods of the starting process
TAM intake air temperature
TCO coolant temperature
TIA temperature in the intake tract
TPS degree of opening of throttle valve
t0 starting operation time point
t1-t3 time point
Z1-Z4 cylinder of the internal combustion engine
ZZP ignition time point
ZZP_ST starting ignition time point, ignition time point during starting

The invention claimed is:

1. A method for starting an internal combustion engine designed for alcohol or a high content of alcohol in a mixed alcohol-gasoline fuel, the method comprising:
setting an early starting ignition time point in a first time period beginning immediately after activation of a starting process of the internal combustion engine, which early starting ignition time point lies in a range from 60° crank angle to 100° crank angle before a top dead center of a piston of the internal combustion engine,
monitoring a rotational speed of the internal combustion engine during the starting process,
upon activation of the starting process of the internal combustion engine, summing cylinder working cycles and, upon the summed cylinder working cycles reaching or exceeding a predetermined number and/or engine speed exceeding a rotational speed threshold value, an ignition time point is shifted starting from the early starting ignition time point toward a late ignition time point, upon the engine speed reaching or exceeding a predetermined rotational speed threshold value, summing a number of cylinder working cycles in which there occurs a rotational speed increase or a rotational speed difference greater than a predetermined threshold value, the summed number of cylinder working cycles in which there occurs the rotation speed increase or the rotational speed difference greater than the predetermined threshold value being different from the summed cylinder working cycles, and comparing the summed number of the cylinder working cycles in which there occurs the rotational speed increase or the rotational speed difference greater than the predetermined threshold with a second predetermined threshold value and, upon the summed number of cylinder working cycles in which there occurs the rotational speed increase or the rotational speed difference greater than the predetermined threshold reaching or exceeding the second predetermined threshold value, shifting the ignition time point starting from the early starting ignition time point toward the late ignition time point, wherein the early starting ignition time point is 90° crank angle before the top dead center of the piston.

2. The method as claimed in claim 1, wherein the early starting ignition time point is an ignition time point which lies between 80° crank angle and 100° crank angle before the top dead center of the piston of the internal combustion engine.

3. The method as claimed in claim 1, wherein the predetermined number and the rotational speed threshold value corresponding to the number of the cylinder working cycles and the second predetermined threshold value are determined on a test bench or in a vehicle containing the internal combustion engine and, dependent on a coolant temperature (TCO) of the internal combustion engine, are stored in a characteristic map in a value memory of a control device which performs open-loop and closed-loop control on the internal combustion engine.

4. The method as claimed in claim 1, wherein the shifting of the early starting ignition time point toward the late ignition time point is begun with a first gradient, and the gradient becomes smaller relative to the first gradient with increasing time up to a time point at which the rotational speed has reached a value for a minimum rotational speed.

5. The method as claimed in claim 4, wherein the value for the minimum rotational speed is determined experimentally on a test bench or in a vehicle containing the internal combustion engine dependent on an alcohol content in the fuel and is stored in a characteristic map in a value memory of a control device which performs open-loop and closed-loop control on the internal combustion engine.

6. The method as claimed in claim 1, wherein the method is performed for operating the internal combustion engine using fuel which contains at least 70% of ethanol.

7. The method as claimed in claim 6, wherein the method is performed for operating the internal combustion engine using fuel containing 100% ethanol.

8. The method as claimed in claim 1, wherein the ignition time point is shifted starting from the early starting ignition time point toward the late ignition time point upon the summed cylinder working cycles reaching or exceeding the predetermined number.

9. The method as claimed in claim 1, wherein the predetermined rotational speed threshold value corresponds to the internal combustion engine generating a torque not associated with a starting device.

10. A device for starting an internal combustion engine configured for alcohol or a high content of alcohol in a mixed alcohol-gasoline fuel, which device includes a processor and at least one memory containing a program which configures the device to carry out a method comprising:

setting an early starting ignition time point in a first time period beginning immediately after activation of a starting process of the internal combustion engine, which early starting ignition time point lies in a range from 60° crank angle to 100° crank angle before a top dead center of a piston of the internal combustion engine, monitoring a rotational speed of the internal combustion engine during the starting process, upon activation of the starting process of the internal combustion engine, summing cylinder working cycles and, upon the summed cylinder working cycles reaching or exceeding a predetermined number and/or engine speed reaching or exceeding a rotational speed threshold value, an ignition time point is shifted starting from the early starting ignition time point toward a late ignition time point, upon the engine speed reaching or exceeding a predetermined rotational speed threshold value, summing a number of cylinder working cycles in which there occurs a rotational speed increase or a rotational speed difference greater than a predetermined threshold value, the summed number of cylinder working cycles in which there occurs the rotation speed increase or the rotational speed difference greater than the predetermined threshold value being different from the summed cylinder working cycles, and comparing the summed number of the cylinder working cycles in which there occurs the rotational speed increase or the rotational speed difference greater than the predetermined threshold with a second predetermined threshold value and, upon the summed number of cylinder working cycles in which there occurs the rotational speed increase or the rotational speed difference greater than the predetermined threshold reaching or exceeding the second predetermined threshold value, the ignition time point is shifted starting from the early starting ignition time point toward the late ignition time point, wherein the early starting ignition time point is 90° crank angle before the top dead center of the piston.

11. The device as claimed in claim 10, wherein the early starting ignition time point is an ignition time point which lies between 80° crank angle and 100° crank angle before the top dead center of the piston of the internal combustion engine.

12. The device as claimed in claim 10, wherein the predetermined number and the rotational speed threshold value corresponding to the number of the cylinder working cycles and the second predetermined threshold value are determined on a test bench or in a vehicle containing the internal combustion engine, dependent on a coolant temperature (TCO) of the internal combustion engine, and stored in a characteristic map in a value memory of a control device which performs open-loop and closed-loop control on the internal combustion engine.

13. The device as claimed in claim 10, wherein shifting the ignition time point from the early starting ignition time point toward the late ignition time point initially occurs with a gradient which becomes smaller with increasing time up to a time point at which the rotational speed has reached a value for a minimum rotational speed.

14. The device as claimed in claim 13, wherein the value for the minimum rotational speed is determined experimentally on a test bench or in a vehicle containing the internal combustion engine, dependent on an alcohol content in the fuel and is stored in a characteristic map in the at least one memory for the device to perform open-loop and closed-loop control on the internal combustion engine.

15. The device as claimed in claim 10, wherein the device controls operation of the internal combustion engine which uses fuel which contains at least 70% of ethanol.

16. The device as claimed in claim 15, wherein the device controls operation of the internal combustion engine which uses fuel containing 100% ethanol.

17. The device as claimed in claim 10, wherein the ignition time point is shifted starting from the early starting ignition time point toward the late ignition time point upon the summed cylinder working cycles reaching or exceeding the predetermined number.

18. The device as claimed in claim 10, wherein the predetermined rotational speed threshold value corresponds to the internal combustion engine generating a torque not associated with a starting device.

\* \* \* \* \*